United States Patent [19]

Alfter et al.

[11] 4,125,351

[45] Nov. 14, 1978

[54] PROCESS FOR THE PRODUCTION OF A FORMING TOOL FROM REACTIVE RESINS WITH FILLERS, AND FORMING TOOL

[75] Inventors: Franz Alfter, Siegburg; Hans-Ulrich Breitscheidel, Troisdorf; Paul Spielau, Troisdorf-Eschmar, all of Fed. Rep. of Germany

[73] Assignee: Dynamit Nobel Aktiengesellschaft, Fed. Rep. of Germany

[21] Appl. No.: 780,787

[22] Filed: Mar. 24, 1977

[30] Foreign Application Priority Data

Mar. 24, 1976 [DE] Fed. Rep. of Germany ....... 2612369

[51] Int. Cl.² .......................... B29C 1/00; B29C 17/00

[52] U.S. Cl. ................................ 425/403; 425/405 R; 425/384; 425/DIG. 60; 249/134

[58] Field of Search ............... 425/446, DIG. 29, 403, 425/405 R, 388; 249/134

[56] References Cited

U.S. PATENT DOCUMENTS

| 2,907,070 | 10/1959 | Van Hartesveldt | 425/DIG. 29 |
| 3,001,582 | 9/1961 | Kindseth et al. | 249/134 X |
| 3,353,219 | 11/1967 | Snyder | 425/446 X |

*Primary Examiner*—J. Howard Flint, Jr.
*Attorney, Agent, or Firm*—Craig & Antonelli

[57] ABSTRACT

Forming tool comprising a shaped structure that is porous and air-permeable and that is made from a reactive resin and at least one inert filler.

12 Claims, 2 Drawing Figures

PROCESS FOR THE PRODUCTION OF A FORMING TOOL FROM REACTIVE RESINS WITH FILLERS, AND FORMING TOOL

The present invention as claimed herein relates to a forming tool made from reactive resins and inert fillers, especially suitable for molding with the vacuum forming method.

The use of epoxy casting resins in the manufacturing tool industry for the production of manufacturing tools, such as models, coreboxes for sand casting, devices for the mounting of templates for cutting machining operations, drawing tools, casting molds, hot-forming molds, as well as compression molds for the processing of synthetic resins, working models for the ceramic industry, etc., has been known for a long time and has been described in detail, for example, in "VDI Richtlinien" (German Engineers' Association Rules) 2007 of June 1966. The forming tools from epoxy casting resins generally are provided with a dish-like or layered structure. The surface layer (active area) is thin in most cases, and relatively rich in resin, and contains very fine-grained, pulverulent fillers, the selection of which depends on the use requirements, such as surface quality, abrasive strength, impact resistance, thermostability, workability, etc. Behind the surface layer, backfilling compositions and/or reinforcing and supporting structures are then provided. The backfilling compositions, in this structure, are substantially less rich in resin than the surface layers and can obtain coarser fillers. To reduce the weight of the backfilling, especially lightweight fillers, hollow bodies, hard foam materials, pumice, and the like can be incorporated. Also, it is possible in case of certain casting resin compositions to obtain a porous, foamy structure of the backfilling by the use of certain additives. If necessary, a laminate layer can furthermore be incorporated for reinforcing purposes between the surface layer and the backfilling material.

Since the surface quality of a synthetic resin molding is determined by the surface characteristic of the forming tool, the surface of the mold is, in case of forming tools made from epoxy resins, provided with a mold release agent — in order to prevent the adhesion of the casting resin molding composition on the surfaces of the forming tool. In this connection, the forming tools are to be dry in all cases. Porous materials, such as plaster of paris, wood, casting materials, etc., must be additionally provided with so-called pore or form sealing compounds so that the pores are sealed before the mold release agents are applied.

Suitable fillers for the casting resin compositions are inert fillers which, in most cases, are of an inorganic nature, such as, for example, quartz powder or ground slate, sands, metal powders, glass fibers. In this connection, a weight ratio of resin-curing agent to filler of about 1:8 is proposed for the backfilling materials which have a lower resin content, corresponding to about 12.5% by weight:100% by weight; in such a case, resin-curing agent to filler ratios of 1:4 to 1:1 are suitable for the surface layer of a higher resin content.

It has now been found that the molded components produced with the aid of such forming tools, especially synthetic resin moldings, always exhibit a glossy, smooth surface. If, for example, a molded component or article having a polyethylene film on its surface is being molded in such a forming tool based on an epoxy casting resin with high filler proportions and with a mold surface layer with all of the pores being tightly sealed, then the molded component or article has a so-called greasy appearance on the side laminated with the polyethylene film. Such an appearance is not desirable in all cases, and the question then arises how this can be eliminated. It makes no difference in the manufacture of the molded component or article whether the component is produced in the forming tool in accordance with the vacuum forming, excess-pressure forming, or compression molding methods. It is possible to roughen the surface of the forming tool subsequently, for example by sandblasting, etching, or with the use of a further coating. However, these experiments do not lead to satisfactory, rough surfaces in case of forming tool surfaces on an epoxy casting resin basis. The other method, namely to coat the surface of the forming tool, for example, with fabrics or other materials, is suitable only for smaller series, but not for mass production.

The invention is based on the problem of providing a forming tool based on or formed from reactive resins and inert fillers, by means of which molded components having a matte surface can be produced. This problem is solved by a forming tool which is formed from reactive resins and inert fillers and which is porous and air-permeable. In this connection, a mold surface layer and optionally a backfilling can be provided. The porosity and air permeability of the forming tool is obtained, for example, by a reactive resin proportion (casting resin composition) in the surface layer of the mold of about 3–5% by weight, based on the amount of inert filler. An especially suitable inert filler in the mold surface layer is fine-grained quartz sand, aluminum grit, or glass beads, wherein a fine granulation is utilized with a preferred particle diameter and/or particle size of 0.1–0.3 mm. This combination of materials imparts a sufficient air permeability to the mold at any location thereof, there still being a sufficient mutual binding of the filler particles, but no filling in of the cavities present between the grains with reactive resin. It is especially important that the reactive resin employed have a certain viscosity so that it does not penetrate downwardly and forms an air-impermeable layer. Reactive resins having a viscosity of about 15,000 to 18,000 cp. have proved to be especially suitable.

A suitable reactive resin is, for example, an epoxy resin based on bisphenol A with the addition of a curing agent based on an aliphatic amine for cold curing, wherein the ratio of resin to curing agent is preferably 5:1. In case of epoxy resins, primarily liquid aliphatic polyamines and polyamidoamines are used for cold curing, while, for example, aromatic amines or their derivatives are employed for hot curing at above 80° C., i.e. from 80° C. to 150° C. Cold curing molding compositions are preferably used for the present invention, i.e. those which cure at room temperature.

Consequently, the forming tool fashioned to be porous and air-permeable in accordance with the invention is thus simultaneously equipped with a slightly roughened mold surface. This forming tool ensures a sufficient air permeability of the mold in any zone, so that the material to be molded is firmly pressed against the mold surface at all points, whereby extremely small, light-refracting unevennesses are molded into the surface. The forming tool can be used particularly advantageously in the vacuum forming process, since here the required bores for taking in the air are eliminated, and the vacuum is applied directly through the porous, air-permeable mold. In this case, the material to be molded is firmly sucked against the mold surface at all locations, and flawless, matte-finish article surfaces are thus attainable. Similar results can also be accomplished when using the compression molding or excess pressure molding methods.

In rather large forming tools, a backfilling of somewhat coarser materials is ordinarily provided in addition to the mold surface layer. In the forming tool of this invention, a backfilling can be included made-up of a mixture of quartz sand and reactive resin, wherein the particle size of the quartz sand is preferably between 2 and 3 mm., and the proportion of reactive resin is preferably between 2 and 4% by weight, based on the amount of quartz sand. Thus, the backfilling has a coarser grain than the mold surface layer, but here, too, such a minor resin proportion is provided that, although there is a sufficient mutual binding of the grains to one another, the cavities between the grains are not filled up. Preferably the same reactive resin is employed for the backfilling as the one used for the surface layer, so that the binding of the filler particles in the surface layer and in the backfilling to one another as well as at the parting zone is effected by the same type of resin. It is also possible to employ, for the backfilling, a different inert filler, for example aluminum beads of a size of 2-3 mm., approximately.

Depending on the size of the forming tool, a reinforcement can additionally be arranged, for example, of wire mesh or plastic or textile materials, embedded preferably in the zone of the backfilling. This also increases the bending strength of the forming tool.

Moreover, it is also possible to embed in the forming tool, depending on the material to be processed, cooling devices, such as cooling pipes, cooling coils, or the like, which are arranged as closely as possible to the mold surface layer.

The forming tool of this invention is especially well suitable for the production of molded single- or multiple-layer thermoplastic synthetic resins and/or synthetic resin foam materials in according with the vacuum forming method with a matte surface. A special advantage in this connection is that the intake bores for the vacuum need not be provided in the forming tool, since the vacuum is applied directly through the entire forming tool. At the same time, this results in an extremely uniform contact of the material to be molded against the entire surface of the mold due to the vacuum. Those parts of the forming tool which do not come into contact with the material to be molded and which are located outside of this zone are then covered, for example, with a sealing layer, sheet, sealing cord, or the like, so that a defined space is available for the production of the vacuum.

Examples for materials and/or material combinations for the molding procedure employing the forming tool of this invention are foam materials having a film laminated to one or both sides. For example, a closed-cell crosslinked polyethylene foam can be laminated on one side with a polyethylene film or sheet. Such a combination of materials has the advantage that the abrasion resistance of the surface is increased due to the polyethylene film. When molding this combination of materials in the conventional forming tools on the basis of resin-enriched molding tools or metallic molding tools, the polyethylene film presents a glossy or greasy appearance. When molding this combination of materials in the forming tool proposed according to this invention, however, a fine surface embossing of the polyethylene film is produced, imparting a matte appearance to the film.

In the furthermore proposed process for manufacturing a forming tool on the basis of reactive resins with reactants and inert fillers, especially for the vacuum forming method, the procedure is such that the filler is mixed under agitation with 3-5% by weight of reactive resin, based on the entire amount of filler, the mixture is then poured into a model mold and, under slight pounding, a mold surface layer is formed and then cured. Especially suitable fillers are fine-grained fillers, such as quartz sand, aluminum grit, or glass beads having a particle size or particle diameter of about 0.1-0.3 mm. The reactive resin is to have a viscosity of about 15,000 to 18,000 cp., so that, through effecting a sufficient wetting and binding of the filler particles among one another, the resin cannot run toward the bottom due to gravity and form a resin layer or a resin-enriched layer. When conducting the process, for example, this fine-grained quartz sand is mixed with a specific epoxy resin on the basis of bisphenol A with a viscosity of about 15,000 to 18,000 cp. with the addition of a curing agent on the basis of aliphatic amines, in a ratio of resin to curing agent of preferably 5:1. This is a cold-curing molding composition. To manufacture, for example, a male manufacturing forming tool, the sand-resin mixture is filled into a female model mold and distributed under simultaneous pounding so that a mold surface layer of a thickness of about 10-15 mm. is produced over the entire surface. The remaining, residual cavity is then filled out with a backfilling consisting, for example, of a quartz sand of a substantially coarser grain, preferably 2-3 mm. or alternatively, for example, of aluminum particles having a similar particle size. The mutual binding of these filler grains with one another as well as at the separating layer with the finer grains of the mold surface layer is preferably provided by the same type of resin. This type must have a certain viscosity, so that it does not run through in an downward direction and forms an air-impermeable layer.

To increase the dimensional rigidity and flexural strength of the forming tool, a reinforcement, for example a wire mesh, a fabric, or the like and/or cooling means, such as cooling pipes, can be inserted in the backfilling composition while the latter is filled in, and can thus be embedded therein.

In order to seal especially the mold surface zones, which do not come into contact with the workpiece to be molded, in an airtight manner, these parts of the surface of the forming tool are provided with a sealing layer, film, sealing cord, or the like, except, of course, for the zone for the vacuum connection.

The invention is illustrated in the drawing by way of an embodiment and will be explained in greater detail below with reference thereto. In the drawings.

Figure 1:
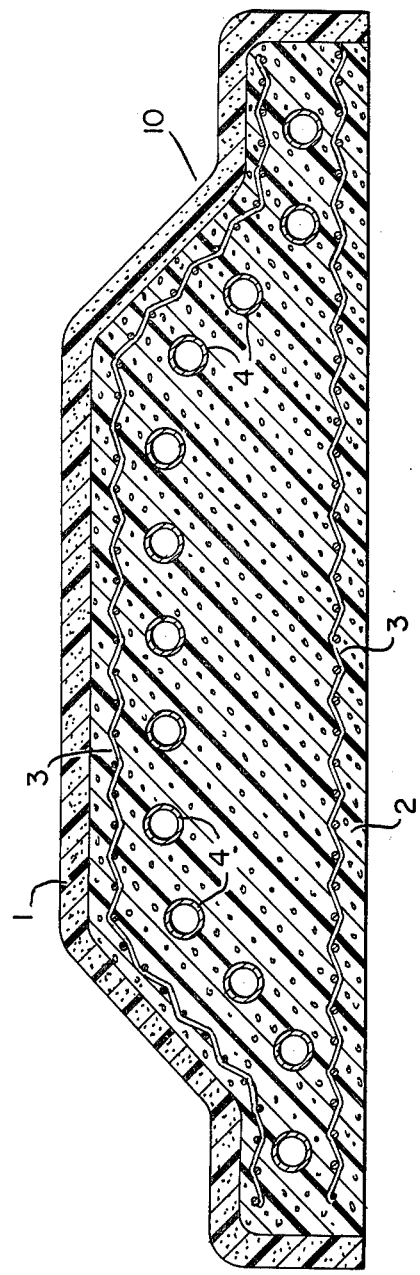
FIG. 1 shows a cross-section through a forming tool.

The forming tool 10 according to FIG. 1 has the surface layer 1 and the backfilling 2. A reinforcing fabric 3 is inserted in the backfilling for reinforcing purposes and furthermore the cooling pipes 4 are embedded in the backfilling 2.

To produce the mold surface layer 1, for example, 5 kg. of quartz sand having a particle size of 0.1-0.3 mm. is mixed in an agitator-equipped unit with 180 g. of reactive resin consisting of 150 g. of epoxy resin type Atlas EPT 200 from Degussa (BRO) having a viscosity of 15,000–18,000 cp., and 30 g. of a curing agent on the basis of a reactive polyamine type Atlas Härter H 10 from Degussa. This quartz sand-resin mixture is filled immediately after mixing into a female mold and distributed so that the layer thickness of the surface layer is about 10–15 mm. To avoid the formation of shrinkholes, the quartz sand-resin mixture is slightly pounded during distribution and thereafter. Subsequently, a second mixture is produced, consisting of quartz sand having a particle size of 2–3 mm. with a proportion of 2.4% by weight of reactive resin of the same type as that of the mold surface layer, based on the amount of quartz sand. This mixture serves for backfilling the remaining cavity of the mold surface layer and is likewise filled in immediately after the mixing step and is slightly pounded. Depending on the size of the forming tool, a reinforcement of a wire mesh or the like is additionally inserted to increase the flexural strength of the forming tool. Depending on the field for which the forming tool is being used, it is also possible to embed cooling coils or cooling pipes in order to cool the mold. The removal of the forming tool 10 from the female mold can take place after about 20 hours; the forming tool can be placed in use after about 32 hours.

Figure 2:
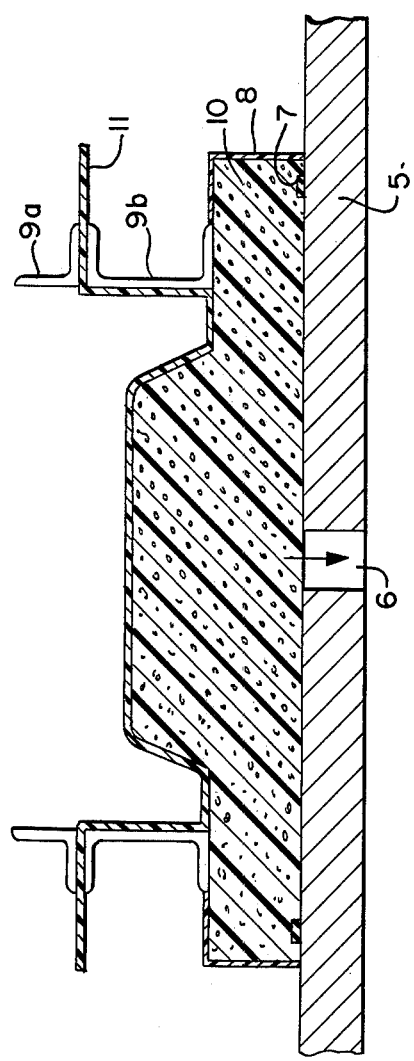
FIG. 2 shows a cross-section through the forming tool for vacuum forming.

FIG. 2 shows the forming tool of FIG. 1, used for vacuum forming. For this purpose, the forming tool 10 is firmly placed on the mold table 5 and sealed along the rim by means of the gasket 7. The clamping frame with bottom portion 9a and top portion 9a defines the sidewalls of the mold and serves for clamping the material 11 to be molded into position. In the zone between the clamping frame 9b and the mold table 5, the forming tool 10 is provided with the seal 8 on its outside. Through the opening 6 in the mold table 5, the vacuum is applied to the forming tool 10. The forming tool proper has no intake ducts for the vacuum. By means of the arrangement shown in FIG. 2, it is possible to mold by the vacuum forming method, for example, foam materials laminated with synthetic resin films, but also other molded components from ABS (acrylonitrile-butadiene-styrene) polymers or PVC sheets or panels, i.e. not only foamed synthetic resins or combined synthetic resins, but also solid synthetic resins which, due to the use of the porous and air-permeable forming tool, are provided with a matte, embossed surface.

In the arrangement shown in FIG. 2, the air permeability of the forming tool is desirable only in the zone where the molding material is in contact with the forming tool, so that the lateral areas outside of the clamping frame are sealed-off by a coating of lacquer or resins, as indicated in the drawing.

What is claimed is:

1. A forming tool made from reactive resins and inert fillers for the molding of single- or multiple-layer thermoplastic synthetic resins and/or foamed synthetic resins, and especially suitable for molding with the vacuum forming method, which comprises a forming tool shaped structure that is porous and air-permeable and that has a mold surface layer defining a roughened mold surface for molding said synthetic resins with a matte-finish surface, said mold surface layer containing a mixture of a reactive resin and a particulate inert filler, the reactive resin proportion in the mold surface layer being about 3–5% by weight, based on the weight of inert filler contained within said surface layer.

2. A forming tool according to claim 1, wherein said structure also has a backfilling portion disposed in contact with one side of said mold surface layer and said backfilling portion comprising a mixture of a reactive resin and an inert filler having a particle size larger than the particle size of the inert filler in said mold surface layer.

3. A forming tool according to claim 1, wherein the inert filler in said mold surface layer comprises fine-grained quartz sand, aluminum grit, or glass beads, said inert filler having a particle size of 0.1–0.3 mm.

4. A forming tool according to claim 1, wherein said reactive resin comprises a resin having a viscosity of about 15,000 to 18,000 cp.

5. A forming tool according to claim 1, wherein said reactive resin comprises an epoxy resin based on bisphenol A with the addition of a curing agent based on an aliphatic amine for cold curing, wherein the weight ratio of resin to curing agent is preferably 5:1.

6. A forming tool according to claim 2, wherein the backfilling portion consists of a mixture of quartz sand and reactive resin, wherein the particle size of the quartz sand is preferably between 2 and 3 mm. and the proportion of reactive resin is preferably between 2 and 4% by weight, based on the weight amount of quartz sand.

7. A forming tool according to claim 2, wherein reinforcement means are embedded in the backfilling portion.

8. A forming tool according to claim 1, wherein a nonactive portion of the mold surface of the forming tool is covered with a sealing layer.

9. A forming tool according to claim 2, wherein means for cooling the tool are embedded in the backfilling portion.

10. A forming tool according to claim 2, further comprising means for supporting said backfilling portion, means for sealing said backfilling portion to said support means and means for applying a vacuum to said mold surface layer via said backfilling portion.

11. A forming tool according to claim 10, wherein said means for applying a vacuum includes an opening in said support means in communication with said backfilling portion.

12. A forming tool according to claim 2, wherein said mold surface layer comprises a mixture of a reactive resin having a viscosity of about 15,000 to 18,000 cp. and an inert filler comprising fine-grained quartz sand, aluminum grit, or glass beads having a particle size of 0.1–0.3 mm and the backfilling portion consists of a mixture of quartz sand and said reactive resin, the particle size of the quartz sand being between 2 and 3 mm and the proportion of reactive resin in the backfilling portion being between 2 and 4% by weight, based on the weight of quartz sand.

* * * * *